United States Patent Office 3,373,210
Patented Mar. 12, 1968

3,373,210
PROCESS FOR THE PRODUCTION OF
ALKYLPHENOLS
Fumihiko Nishio and Reichi Oi, Ashigara-Kamigun,
Kanagawa, Japan, assignors to Fuji Shashin Film
Kabushiki Kaisha, Kanagawa, Japan
No Drawing. Filed Oct. 22, 1965, Ser. No. 502,275
Claims priority, application Japan, Nov. 4, 1964,
39/62,399
7 Claims. (Cl. 260—624)

The present invention relates to a process for the production of alkylphenols and more particularly to a process for the preparation of 1,1,3,3-tetramethylbutyl derivatives of phenols by the reactions of phenols and diisobutylene in the presence of methanol, sulfuric acid being used as a catalyst. The term "phenols" as used in the specification and claims means any aromatic compound having at least one hydroxyl group bonded to the aromatic nucleus.

Alkyl derivatives of phenols are useful as antioxidants in oils and fats and in petroleum products and are also useful as industrial raw materials for producing surface active agents, coating materials, plastics and the like.

There are many patents and reports disclosing processes for synthesizing para-1,1,3,3-tetramethylbutyl phenol by the reaction of phenol and diisobutylene. For example, such disclosures are found in U.S. Patent 2,727,895 in which $FeCl_3$ is used as a catalyst, U.S. Patent 2,332,555 in which $SnCl_4$ is used as a catalyst, and Journal of the American Chemical Society, vol. 55, 2571 (1933) in which sulfuric acid is acetic acid is used as a catalyst. According to the prior art, in synthesizing 2,4-di-1,1,3,3-tetramethylbutyl phenol by the condensation of phenol and 2 equivalents of diisobutylenes, the use of sulfuric acid as a catalyst gives very low yield (Journal of the American Chemical Society; vol. 60, 2495 (1938)) and hence, in order to obtain the compound with a good yield, the use of $BF_3$ as the catalyst is necessary (French Patents 1,103,485 and 1,209,863). A process for synthesizing 2,5-di-1,1,3,3-tetramethylbutyl hydroquinone from hydroquinone and diisobutylene is reported in which sulfuric acid in an acetic acid solution is used as the catalyst (Collection of Czechoslovak Chemical Communication; vol. 29, 381 (1964)).

The inventors have found that alkyl derivatives of phenols can be obtained with good yields by the reaction of phenols and diisobutylene in the presence of methanol, sulfuric acid being used as the catalyst.

Since sulfuric acid has been generally used as the cheapest catalyst for a Friedel-Crafts' reaction, it may be natural to consider sulfuric acid for use as the catalyst for producing the above-mentioned alkyl derivatives of phenols in an industrial scale, but when sulfuric acid alone is used in the reaction, the polymerization of diisobutylene predominates and hence the yield of the alkyl derivatives is very low. A process has been disclosed in which the alkylation is carried out in the presence of acetic acid by using sulfuric acid as the catalyst, but in this method also, the polymerization of diisobutylene occurs unavoidably and, further, in order to reduce the occurrence of polymerization, an extremely large amount of acetic acid is required, which makes this process industrially unprofitable. That is, in order to obtain 40.3 g. (36.2%) of a dialkyl derivative from 36.6 g. of hydroquinone, 50 g. of sulfuric acid and 750 ml. of acetic acid are necessary. (Collection of Czechoslovak Chemical Communication; vol. 29, 381 (1964).)

On the other hand, when the alkylation is carried out in the presence of methanol in an amount substantially the same as that of sulfuric acid as the catalyst, according to the process of this invention, the polymerization of diisobutylene by a sulfuric acid catalyst can be almost prevented, the yield for the alkylation can be increased, and the reaction product can be easily purified. Such a process for producing alkylphenols by the reaction of phenols and diisobutylene using sulfuric acid as the catalyst in the presence of methanol has never been reported and the present invention, has novelty and industrial usefulness.

A suitable mixing ratio of a phenol and diisobutylene in the process of this invention is 1:1 (in mole ratio) in the monoalkylation (in the case of introducing a 1,1,3,3-tetramethylbutyl group in the aromatic nucleus) and from 1:2 to 1:4 (in mole ratio) in the dialkylation (in the case of introducing two 1,1,3,3-tetramethylbutyl groups into the aromatic nucleus). Sulfuric acid used in this invention as the catalyst is suitably commercially available concentrated sulfuric acid, but it may contain a small amount of water. A suitable proportion of sulfuric acid is from 25 ml. to 500 ml. preferably from 100 ml. to 200 ml. per 1 mole of a phenol. The proportion of methanol to be added in the reaction system may be from about ½ to 2 times the volume of sulfuric acid in the system, but the use of methanol in the same volume as that of sulfuric acid is particularly suitable.

A suitable reaction temperature is from 25° to 70° C. and preferably from 35° to 55° C. The reaction vessel in this invention may preferably be equipped with stirring means, a thermometer, heating means and cooling means. Any order of addition of the phenols, diisobutylene, sulfuric acid, and methanol may be adopted in this invention. For example, the method may be one in which sulfuric acid is added in a mixture of a phenol, diisobutylene, and methanol, a mixture of sulfuric acid and methanol may be added to a mixture of a phenol and diisobutylene, or sulfuric acid may be added to a mixture of a phenol and methanol and then diisobutylene may be added to the mixture. The reaction generally is completed after from about 30 minutes to 8 hours.

The reaction product is directly dissolved in an organic solvent if the thus formed alkyl phenol is present without being precipitated or separated in a layer. If the alkyl phenol is precipitated or separated in a layer, it is recovered by filtration or decantation and dissolved in an organic solvent. After washing with an aqueous alkali solution, the organic solvent is distilled off and the remaining alkyl phenol is recovered. The product may be refined by distillation or recrystallization if necessary.

The invention will further be explained by the following examples.

*Example 1*

A mixture of 20 ml. of methanol and 20 ml. of sulfuric acid was added dropwise into a mixture of 18.8 g. of phenol and 22.6 g. of diisobutylene at 45° C. with stirring and then the system was reacted for 2 hours. After cooling, the product was dissolved in benzene. After washing the benzene solution with an aqueous sodium carbonate solution, benzene was distilled off and the remaining p-1,1,3,3-tetramethylbutyl phenol was subjected to distillation under diminished pressure. The boiling point of the product was 165–170° C./23 mm. Hg and the yield was 24 g. (60%). The same procedure was repeated by using diisobutylene in an amount twice as large as that in the above experiment to give 30 g. of a mixture of 45% 1,1,3,3-tetramethylbutyl phenol and 55% 2,4-di-1,1,3,3-tetramethylbutyl phenol, which could be separated from each other by distillation.

*Example 2*

Into a mixture of 22.2 g. of p-1,1,3,3-tetremethylbutyl phenol, 22.6 g. of diisobutylene, and 10 ml. of methanol was added dropwise 10 ml. of sulfuric acid and the system was reacted for 8 hours at 35–50° C. After washing with water, the product was extracted with ether, washed with aqueous sodium bicarbonate, and after drying by using calcium chloride, was subjected to distillation under diminished pressure to give 17 g. of 2,4-di-1,1,3-tetramethylbutyl phenol. The boiling point of the product was 175–180° C./1 mm. Hg. Besides the above product, 6 g. of p-1,1,3,3-tetramethylbutyl phenol was recovered. Accordingly, the yield of the product was 70%.

*Example 3*

Into a mixture of 11 g. of hydroquinone, 22.6 g. of diisobutylene, and 20 ml. of methanol was added dropwise 20 ml. of sulfuric acid while maintaining the temperature 40–45° C. After reacting for 4 hours at that temperature, the thus precipitated crystals were recovered by filtration and dissolved in 100 ml. of benzene, whereby undissolved impurities were removed by filtration. After washing the benzene solution with water, benzene was distilled off and the thus obtained crystal was rinsed with water and then petroleum ether followed by drying to give 8.5 g. of 2,5-di-1,1,3,3-tetramethylbutyl hydroquinone. The benzene-insoluble matters that had been recovered in the above filtering procedure were dissolved in water and water was evaporated to give 5 g. of hydroquinone. The yield of the product was then 47%.

When the same experiment was repeated by using diisobutylene in an amount twice as much as that in the above experiment, the yield was increased to 11 g.

*Example 4*

Into a mixture of 22 g. of resorcinol, 22.7 g. of diisobutylene and 20 ml. of methanol was added 10 ml. of sulfuric acid and the system was reacted in benzene. The solution was washed with water, dried and then benzene was distilled off. By subjecting the product to a distillation under diminished pressure, 21 g. of 1,1,3,3-tetramethylbutyl resorcinol was obtained. The melting point of the product was 93–95° C. and the yield thereof was 46%.

It will be obvious to those skilled in the art that modifications may be made in the procedure illustratively described above without departing from the scope of the invention as expressed in the following claims.

What is claimed is:

1. A process for the production of an alkylphenol which comprises reacting a phenol with diisobutylene in the presence of methanol using sulfuric acid as a catalyst, the volume of the methanol being from ½ to 2 times the volume of sulfuric acid in the system.

2. The process as claimed in claim 1 wherein the reaction of said phenol and diisobutylene is a monoalkylation and the mol ratio of the phenol to diisobutylene is about 1:1.

3. The process as claimed in claim 1 wherein the reaction of said phenol and diisobutylene is a dialkylation and the mol ratio of the phenol to diisobutylene is from about 1:2 to about 1:4.

4. The process as claimed in claim 1 wherein the amount of sulfuric acid is from about 25 ml. to 500 ml. per 1 mol of said phenol.

5. The process as claimed in claim 1 wherein the amount of sulfuric acid is from about 100 ml. to 200 ml. per 1 mol of said phenol.

6. The process as claimed in claim 1 wherein said reaction is carried out at a tempeature in the range of from 25° to 70° C.

7. The process as claimed in claim 1 wherein said reaction is carried out at a temperature in the range of from 35° to 55° C.

References Cited

UNITED STATES PATENTS 2,332,555  10/1943  Bac _____ 260—624

LEON ZITVER, *Primary Examiner.*

W. LONE, *Assistant Examiner.*